Jan. 15, 1924.
G. R. HOFFMAN
TRANSMISSION BAND
Filed Oct. 10, 1923  2 Sheets-Sheet 1
1,481,098
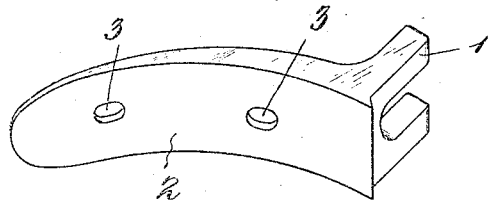
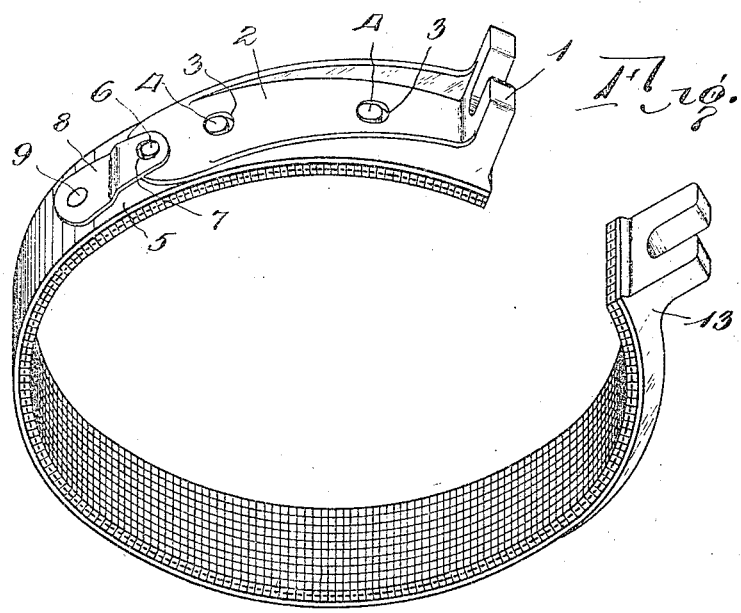

Jan. 15, 1924.
G. R. HOFFMAN
1,481,098
TRANSMISSION BAND
Filed Oct. 10, 1923    2 Sheets-Sheet 2
REISSUED
AS NO.16028
MAR. 24 1925
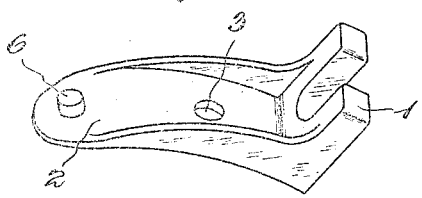
Fig. 3.
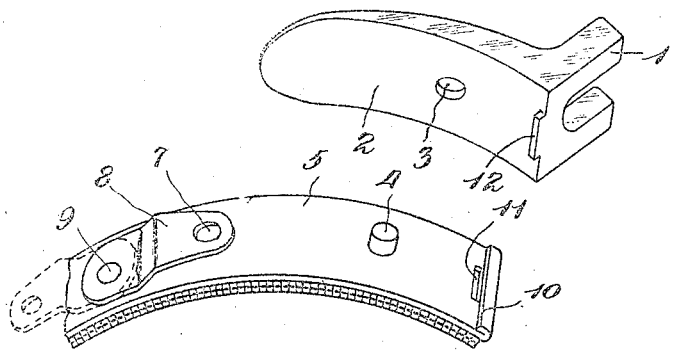
Fig. 4
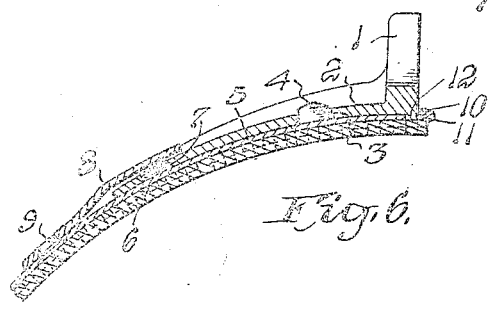
Fig. 5
Fig. 6.
INVENTOR.
Geo. R. Hoffman
BY
ATTORNEY Patented Jan. 15, 1924.

1,481,098

UNITED STATES PATENT OFFICE.

GLENN R. HOFFMAN, OF SPRINGFIELD, ILLINOIS, ASSIGNOR TO HOFFMAN MANUFACTURING COMPANY, OF SPRINGFIELD, ILLINOIS, A CORPORATION OF ILLINOIS.

TRANSMISSION BAND.

Application filed October 10, 1923. Serial No. 667,751.

*To all whom it may concern:*

Be it known that I, GLENN R. HOFFMAN, a citizen of the United States, residing at Springfield, in the county of Sangamon and State of Illinois, have invented certain new and useful Improvements in Transmission Bands; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to transmission bands, such for instance as commonly used with transmissions of the Ford type. It has to do more particularly with the removable ear of the bands, and has for its object to provide an improved construction of removable ear, and improved means for locking the ear to the band, whereby the ear can be more readily attached and detached, the strains are better distributed and the tighter the pull on the ear the tighter the grip of the locking means.

To the accomplishment of the foregoing and such other objects as may hereinafter appear, the invention consists in the features hereinafter described and then sought to be clearly defined by the claims, reference being had to the accompanying drawings forming a part hereof and in which Figure 1 is a perspective of a removable ear made according to the present invention, looking at the under face of the ear;

Figure 2 is a perspective of a transmission band, showing the removable ear applied and locked in position;

Figure 3 is a perspective of a slightly modified form;

Figure 4 is a perspective of the same ear looking at the under face of the ear;

Figure 5 is a perspective of a portion of a transmission band with the ear removed and showing the locking clip in locking position, in full lines, and in unlocking position, in dotted lines.

Figure 6 is a longitudinal section through a portion of a transmission band, showing the removable ear with a cavity in its rear end to receive a stud on the locking lip.

In the drawings the numeral 1 designates the usual notched or forked end of a transmission band ear and 2 the wing or foot of the ear. The wing or foot is formed with one or more holes or openings, 3 to receive correspondingly disposed stud or studs 4 projecting from the transmission band 5 which may be of any approved type, and which will permit the ear to be easily placed in position by merely placing it over the studs, and as easily removed when unlocked by lifting the ear from the stud or studs without movement of the ear longitudinally of the axis of the band. The studs 4 are made without heads and being so made are shorter than studs having heads and consequently will occupy less space and permit the removal and replacement of the band with greater freedom from the space between the pulley or drum and transmission casing without interference with parts of the transmission. Under the present invention the ear is provided at or adjacent to its tip end with a projecting stud 6 designed to enter a cavity or opening 7 formed in a holding clip 8 preferably formed of spring steel and pivoted by a pintle or rivet stud 9 to the transmission band so that the clip may be turned on its pivot to bring it into locking and unlocking relation to the wing of the ear and the stud projecting from it. The free end of the locking lip is preferably elevated to a higher plane than the portion attached by its pivot to the band so as to receive the end or tip of the wing of the ear and exert a downward pressure thereon which wedging action will tend to prevent the accidental turning of the clip on its pivot, which turning will also be prevented by the stud entering the cavity or opening in the free end of the lip. The locking lip being made of spring metal it will spread or distend so as to receive ear wings of varying thicknesses and thus provision is made for use of ears of different makes or dimensions. Another advantage gained by the invention is that when pressure is applied to tighten the band around its drum any tendency to lift the tip end of the ear wing is resisted by the spring bearing locking lip and the tighter the pull or pressure the greater is the resistance afforded by the spring clip. This also serves to hold the ear throughout its area to the surface of the band so that the band will accurately fit to its drum and thus insure a more even grip of the band on the drum and longer life to the band lining, and will also distribute the strains more evenly throughout the area of the ear wing at the different points of attachment or connection between the ear and band. When the band is to be removed the locking lip is pressed from locking engagement with its stud and turned to the position indicated in dotted lines in Figure 5, or as far as necessary, and the ear then lifted from off the attaching stud or studs and out of the casing and then the band is threaded out or drawn out from between the casing and drum without the studs of the band or the locking lip interfering with parts of the transmission contained within the casing. The attachment and detachment of the ear is quickly and easily effected, and the manipulation of the parts does not require skill and there can be no mistake.

In Figures 1 and 2 I have indicated the use of two studs projecting from the band and corresponding openings in the wing of the ear, and no abutment at the end of the band and engaging lug on the ear, as the same is not necessary. In Figures 4 and 5 I have shown an abutment 10 at the end of the band and a slot 11 to receive a lug 12 on the ear, which are preferred in the form illustrated in those figures but the same is not absolutely essential and does not constitute the present invention. I have also illustrated in Figure 2 a permanently attached ear 13 which will be attached in any approved manner customary for attaching the permanent ear and is no part of this invention:—

While it is preferred that the stud 6 shall project from the ear and the cavity to receive it shall be in the resilient locking lip, yet if the position of such parts be transposed so as to have the cavity 7 in the ear and the stud 6 on the underside of the locking lip, for instance as illustrated in Figure 6, such transposition would be within the scope of the invention broadly stated.

I have illustrated and described the preferred details of the invention but changes may be made in the details without departing from the invention.

Having described my invention and set forth its merits what I claim is:—

1. A removable ear for transmission bands formed with an opening to receive a stud attached to the band and having a rigidly attached stud projecting from its outer face at the rear end of the ear adapted to coact with a locking means attached to the band.

2. A removable ear for transmission bands formed with an opening to receive a stud attached to the band, and a resilient locking means attached to the band adjacent to the rear end of the ear, the locking means and the ear being formed one with a cavity and the other with a projection to interengage one with the other.

3. A removable ear for transmission bands formed with an opening to receive a stud attached to the band and having a rigidly attached stud projecting from its outer face at the rear end of the ear, and a resilient locking means attached to the band adjacent to the rear end of the ear and adapted to engage the stud projecting from the ear.

4. A removable ear for transmission bands formed with an opening to receive a stud attached to the band and having a rigidly attached stud projecting from its outer face at the rear end of the ear, and a locking means attached to the band adjacent to the rear end of the ear and formed with a cavity to receive the stud projecting from the ear.

5. A removable ear for transmission bands formed with an opening to receive a stud attached to the band, and a resilient locking means attached to the band adjacent to the rear end of the ear to overlap the end of the ear and exert a downward pressure thereon.

6. A removable ear for transmission bands formed with an opening to receive a stud attached to the band and having a rigidly attached stud projecting from one face, and a rotatable locking means attached to the band adjacent to the rear end of the ear and adapted to be moved to position over the stud projecting from the ear.

In testimony whereof I affix my signature in presence of two witnesses.

GLENN R. HOFFMAN.

Witnesses:
Roy B. McKown,
D. H. Paulding.